March 2, 1943.  G. N. STRIKE  2,312,451

WELDING PROCESS

Filed May 2, 1941  2 Sheets-Sheet 1

INVENTOR.
George N. Strike
Carlos G. Stratton
BY
ATTORNEY

March 2, 1943.  G. N. STRIKE  2,312,451
WELDING PROCESS
Filed May 2, 1941  2 Sheets-Sheet 2

INVENTOR.
George N. Strike
BY Carlos G. Stratton
ATTORNEY

Patented Mar. 2, 1943

2,312,451

UNITED STATES PATENT OFFICE 2,312,451

WELDING PROCESS

George N. Strike, Los Angeles, Calif.

Application May 2, 1941, Serial No. 391,528

7 Claims. (Cl. 29—148.2)

My invention relates to a welding process, and more particularly to a continuous process for producing hollow metallic devices.

An object of the invention is to eliminate the use of sand casting, and hand welding in the production of hollow metallic members.

Another object of the invention is to provide a continuous process for producing and welding together complementary halves of a steam chest, bucks and heads for pressing machines, etc.

Still another object of the invention is to provide a nickel pressing-face upon a hollow steel body.

My invention also has for its object to provide a process that is positive in operation, which will facilitate the production of steam chests and other hollow members.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
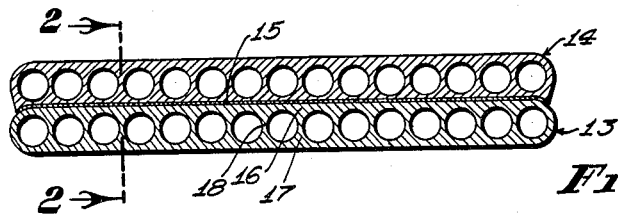
Fig. 1 is a longitudinal section through mating members, taken on the line 1—1 of Fig. 2.
Figure 2:
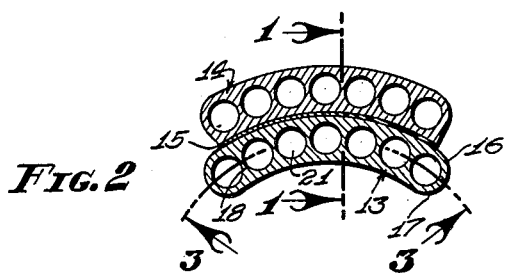
Fig. 2 is a transverse section taken on the line 2—2 of Fig. 1.
Figure 3:
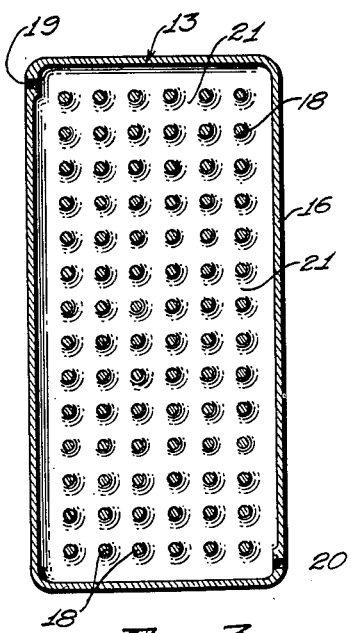
Fig. 3 is a section taken on the arcuate line 3—3 of Fig. 2.

Referring more in detail to the drawings, Figs. 1 and 2 illustrate respectively longitudinal and transverse sections through a buck 13 and head 14 of a pressing machine. The head-engaging face of the buck is convex, and the buck-engaging face of the head is concave. The buck-engaging face of the head is preferably a sheet 15 of nickel, in order to aid in pressing materials arranged upon the buck 13.

Connecting the upper half 16 to the lower half 17 of the buck (and also of the head 14) is a series of studs 18. The studs have been shown round in cross section, although it is believed clear without further illustration that these studs may be square or rectangular in cross section, or waffle patterned. The buck (and also the head) has a steam inlet 19 and a condensation outlet 20 at diametrically the opposite corner. The steam must traverse the numerous passages 21 between the studs 18 in going from the inlet 19 to the outlet 20.

Figure 4:
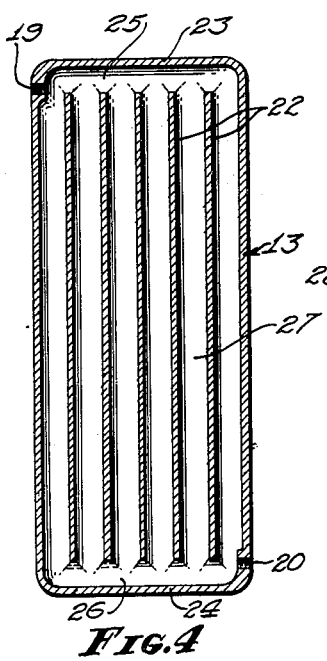
Figs. 4 and 5 are views similar to Fig. 3, but showing modified constructions.

The form shown in Fig. 4 comprises a series of baffles 22 spaced from the ends 23 and 24 to provide passages 25 and 26 respectively. Moreover, passages 27 are provided lengthwise of the body 13 between the baffles 22.

Figure 5:
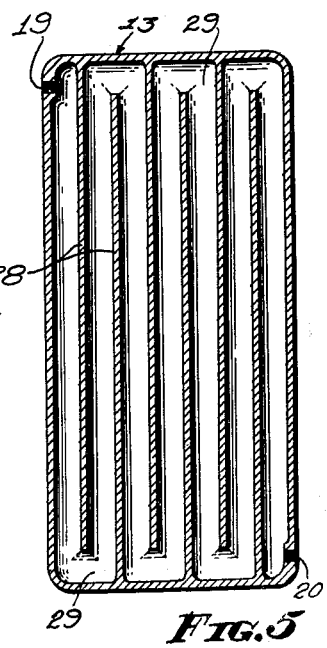

In the form shown in Fig. 5, partitions or baffles 28 are staggered in order to provide a circuitous passage 29 between the inlet 19 and the outlet 20. It is to be understood that these and other patterns of passages and connecting members between the upper and lower faces of the hollow element may be utilized.

To produce any of these various forms, it is preferred that the complementary halves be produced and then welded together in a continuous process. Sheet 2 of the drawings diagrammatically illustrates the process. The twin first steps comprise the forming of the complementary halves. Rollers 30 and 31 are driven (by means not shown) to rotate in the direction of the arrows shown adjacent same. The roller 30 has a groove 32 that extends circumferentially of the roller except for a terminal boss 33. The groove 32 forms the relatively smooth face 34 of one complementary half, while the boss 33 forms the end faces 35 of the complementary half.

The ribs or bosses 36 on the roller 31 form the recesses 37 and the studs, baffles or partitions 38 on the inner face of the complementary half 39.

Another pair of rollers 40 and 41 produce the other complementary half 42. The roller 40 has bosses or ribs 43 that form recesses 44 and studs, baffles or partitions 45 on the inner face of the complementary half 42. The roller 41 has a circumferential groove 46 ending in a terminal boss 47. The groove 46 forms the relatively smooth exterior face 48 of the complementary half 42, while the boss 47 forms the curved ends 49 of the complementary half 42.

Preferably the forming of the two complementary halves, as stated, constitute the first step in a continuous process, with the second step consisting of welding the two halves together while they are still in a heated condition.

Figure 10:
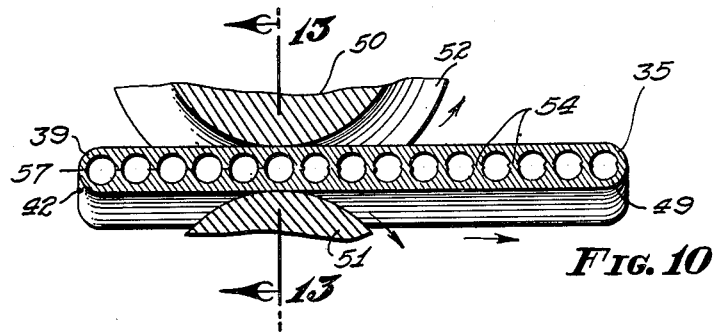
Fig. 10 is a broken transverse section of facing portions of rolls shown welding the complementary halves together.
Figure 11:
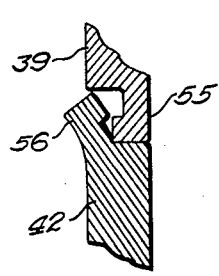
Fig. 11 is a broken section illustrating interlocking means for the complementary halves.

This second step is effected by rollers 50 and 51 which have circumferential grooves 52 and 53 for receiving the complementary halves 39 and 42, which are fed between the rollers 50 and 51 in the direction of the arrow A. As pressure is applied by the rollers 50 and 51, the plastic abutting surfaces of the complementary halves are welded together. Fig. 10 shows a dividing line 57 between the complementary halves 39 and 42 prior to the application of pressure by the rollers 50 and 51, whereas these members are shown joined together as integral, as suggested at 54, after they have passed between the rollers 50 and 51.

Figures 12, 13:
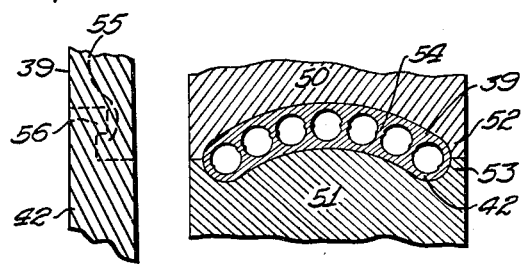
Fig. 12 is a view illustrating the inter-locking portions in welded relationship.
Fig. 13 is a section taken on the line 13—13 of Fig. 10.

If desired, the edges of the complementary members may be formed with inter-locking elements 55 and 56. After the complementary members are arranged together, the inter-locking element 56 may be pressed into place as shown in Fig. 12 and when pressure is applied, the inter-locking means 55 and 56 weld to each other.

Figure 14:
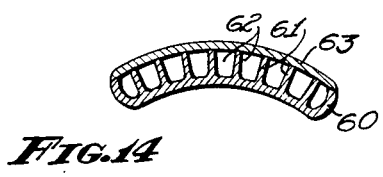
Fig. 14 is a modified construction.
Figure 6:
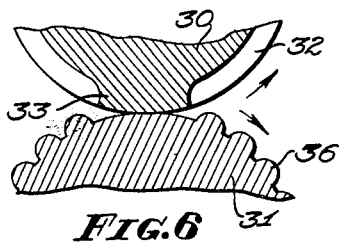
Fig. 6 is a broken transverse section of engaging portions of rolls used to produce a complementary half of the finished product.
Figure 7:
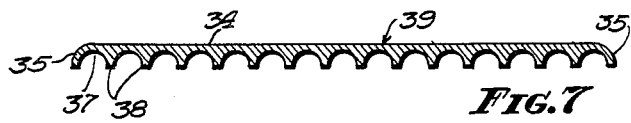
Fig. 7 is a longitudinal section of such complementary half.
Figure 8:
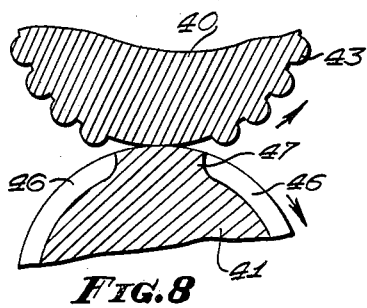
Fig. 8 is a broken transverse section of engaging portions of rolls used to produce the other complementary half of the finished product.
Figure 9:
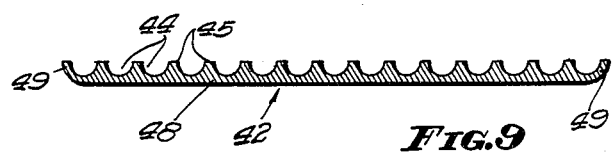
Fig. 9 is a longitudinal section of said other complementary half.

In the form shown in Fig. 14, one complementary element 60 contains bosses or ribs 61 providing spaces or passages 62 therebetween. The other complementary element 63 is a closure member for the spaces or passages within the element 60. The form shown in Fig. 14 may be used for both the buck and head members 13 and 14.

In carrying out my process, it is believed clear that hand welding and sand casting may be eliminated from the manufacture of hollow members, such as steam chests, heads and bucks for pressing machines, etc. The first step consists in rolling the two complementary halves of the finished product, and the second step consists in welding the two halves together, in a continuous process, while the two complementary halves are still in heated condition from the furnace that heated the elements from which the halves were formed.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A welding process to produce a hollow body, comprising rolling recessed complementary heated elements, rolling the complementary elements together while still hot with the recesses facing each other, to weld the elements together by heat and pressure, and bending the body during the welding thereof to impart substantially uniform curvature thereto in one direction.

2. A welding process to produce a hollow body comprising rolling at least one recessed heated member, rolling a heated closing member for the first-mentioned member, rolling and welding the members together while still hot, with the recess interiorly, and bending the body as it is rolled and welded to impart substantially uniform curvature thereto in one direction.

3. A welding process to produce a hollow body, comprising rolling at least one recessed heated member with a rim and with projecting elements located within the rim, rolling a heated closing member having a portion engaging the rim on the first member and having a portion engaging the projecting elements, rolling and welding the members together while still hot, with the recess interiorly, and bending the body during the welding thereof to impart substantially uniform curvature thereto in one direction.

4. A welding process to produce a hollow body, comprising rolling recessed heated complementary elements, rolling the complementary elements together with the recesses facing each other, and pressure welding the same together while the elements are still heated, and bending the body with a substantially uniform transverse curve as it is welded.

5. A welding process to produce a hollow body comprising rolling at least one recessed heated member with a surrounding rim and with projecting elements located within the rim, rolling a heated closing member having a portion engaging the rim on the first member and having a portion engaging the projecting means, rolling and pressure welding the members together, with the recess interiorly, while the members are still heated, and bending the body with a substantially uniform transverse curve as it is welded.

6. A welding process to produce a hollow element comprising rolling at least one heated recessed member with a rim, rolling a complementary heated closing member having a portion engaging the rim on the first member, rolling and pressure welding the members together, with the recess interiorly, while the members are still hot, and bending the element as a whole during rolling and welding, all in a continuous process.

7. A welding process to produce a hollow body, comprising rolling recessed complementary elements with side-closing rim members and with projecting means defining passages within the rim, the projecting means on the respective elements being opposite each other when the elements are facing, facing the elements toward each other, rolling and welding together the rim members to form closed sides, and at the same time rolling and welding together the opposite projecting means on the respective elements, closing the passages laterally, and laterally bending the body as said elements are rolled and welded, the said rolling and welding together of the elements and the bending of the body being in a continuous process while the elements are still heated.

GEORGE N. STRIKE.